United States Patent [19]
Gallenberg

[11] 3,902,520
[45] Sept. 2, 1975

[54] MOBILE IRRIGATION HOSE TURNER

[76] Inventor: Anton Gallenberg, c/o Gallenberg Equipment, RFD 2, Box 191, Antigo, Wis. 54409

[22] Filed: Feb. 1, 1974

[21] Appl. No.: 438,849

[52] U.S. Cl............................ 137/344; 137/355.16
[51] Int. Cl.² ................. A01G 25/02; B05B 15/06
[58] Field of Search............ 137/344, 355.16, 355.17

[56] References Cited
UNITED STATES PATENTS

| | | |
|---|---|---|
| 2,803,498 | 8/1957 | Touton .............................. 137/344 |
| 2,935,080 | 5/1960 | Klimek....................... 137/355.16 X |
| 3,766,938 | 10/1973 | Stracke et al................. 137/355.16 |
| 3,827,454 | 8/1974 | Tarter....................... 137/355.17 X |

Primary Examiner—Henry T. Klinksiek
Attorney, Agent, or Firm—Theodore J. Long; John M. Winter; Harry C. Engstrom

[57] ABSTRACT

A mobile unit for transporting a portion of irrigation hose being pulled behind a mobile irrigation gun or sprayer. The unit has a wheel supported carriage frame and a hose supporting reel mounted for rotation about a substantially upright axis on the frame. Flexible irrigation hose is laid out in a general J-shape in a field with the end of the short run of the hose laid in one furrow connected to the irrigation gun and the end of the longer run in another furrow several rows over connected to a stationary irrigation pipe. The curved portion of the hose is looped around and supported by the freely rotatable reel on the mobile unit, thereby carrying this portion of the hose over the intervening rows of crops. A pair of hose guides are mounted at the front end of the frame to prevent outward lateral movement of the hose being supported by the reel and to maintain the hose turner unit in line as it is pulled forward by the irrigation hose behind the mobile irrigation gun.

6 Claims, 3 Drawing Figures

MOBILE IRRIGATION HOSE TURNER

BACKGROUND OF THE INVENTION

1. Field of the Invention

This invention pertains to farm irrigation apparatus and more particularly to a mobile unit for carrying flexible irrigation hose over rows of crops as it is pulled behind a mobile irrigation gun traveling down the rows of crops.

2. Description of the Prior Art

Irrigation of large crop fields has typically required either a substantial amount of fixed irrigation equipment which irrigates a large portion of the field at one time, or frequent manual repositioning of equipment which irrigates a much smaller area.

One system that has been employed, in an effort to reduce the amount of equipment and human labor involved, consists of a mobile irrigation gun which is either self-propelled or pulled across a field by means of a cable. This mobile irrigation gun is usually supplied with water by a flexible hose which is itself connected to rigid irrigation pipe laid out to the field. A major disadvantage of this system results from the necessity of trailing the flexible hose behind the gun as it traverses the field. The drag produced by pulling a trailing hose in a straight line from one end of the field to the other interferes with the movement of the mobile irrigation gun, and results in large stress forces on the hose of sufficient magnitude to damage or burst the hose. If the hose is dragged across the rows of crops the result is that several rows of crops may be damaged or destroyed each pass.

SUMMARY OF THE INVENTION

I have invented a mobile unit for continuously lifting a portion of a flexible irrigation hose being trailed behind an irrigation gun or sprayer from one furrow between two rows of crops, turning it around 180°, and then laying it down in another furrow where it has been connected to the end of an irrigation pipe. My unit thus transports the irrigation hose over rows of crops without damaging them.

The unit has a carriage frame which is supported above the ground by two laterally spaced rear wheels and a single front wheel which is centrally positioned laterally with respect to the rear wheels. This positioning of the wheels allows the two rear wheels to span and avoid at least two rows of crops while the front wheel rides between two of the rows that the rear wheels span. A reel is rotatably mounted to the carriage frame in a substantially horizontal plane but declines slightly toward the front of the carriage frame. The reel has a rim around which the irrigation hose is turned, and a flange which extends radially outward from the rim for elevating the irrigation hose. A pair of hose guides are mounted to the carriage frame forwardly of the reel. Each hose guide comprises a laterally adjustable arm member and a pair of rollers, one being affixed parallel to the arm member and the other transverse to the arm member.

In using my hose turner unit, an irrigation hose which extends rearwardly from an irrigation gun with its other end connected to a rigid irrigation pipe is looped around the reel of the turner and between the hose guides. The portion of the hose traversing the crop rows is thus carried over the crops and the drag of the hose is greatly reduced. As the irrigation gun moves forward it pulls the irrigation hose and thus the hose turner after it, the travel of the hose turner being maintained in a straight line following the gun by the constraining action of the transverse rollers on the hose.

Further objects, features and advantages of my invention will be apparent from the following detailed description taken in conjunction with the accompanying drawings showing a preferred embodiment of a mobile irrigation hose turner exemplifying the principles of my invention.

DESCRIPTION OF A PREFERRED EMBODIMENT

Figure 1:
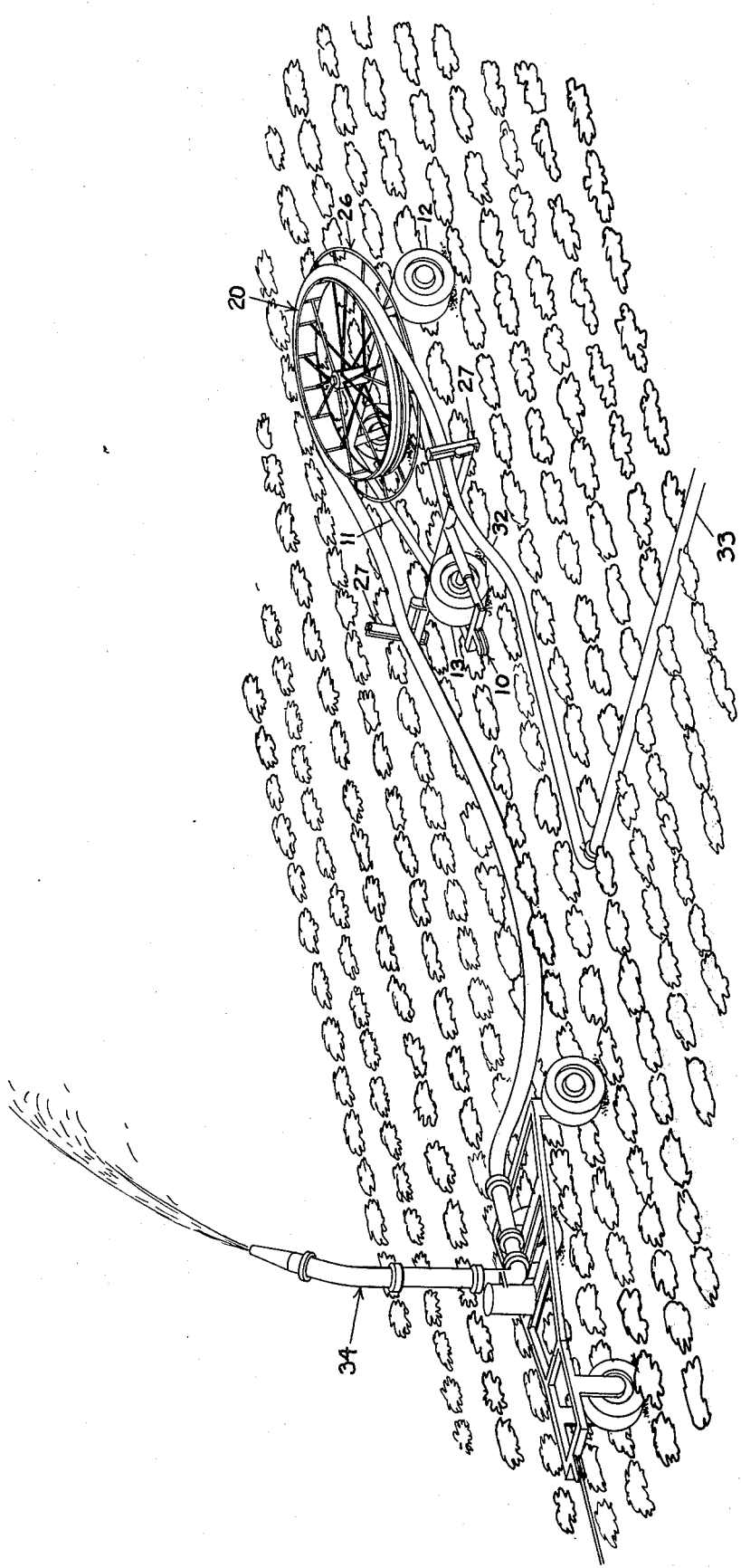
FIG. 1 is an isometric view showing my mobile irrigation hose turner in use in a field of crops with a mobile irrigation gun and associated irrigation hose and pipe.
Figure 2:
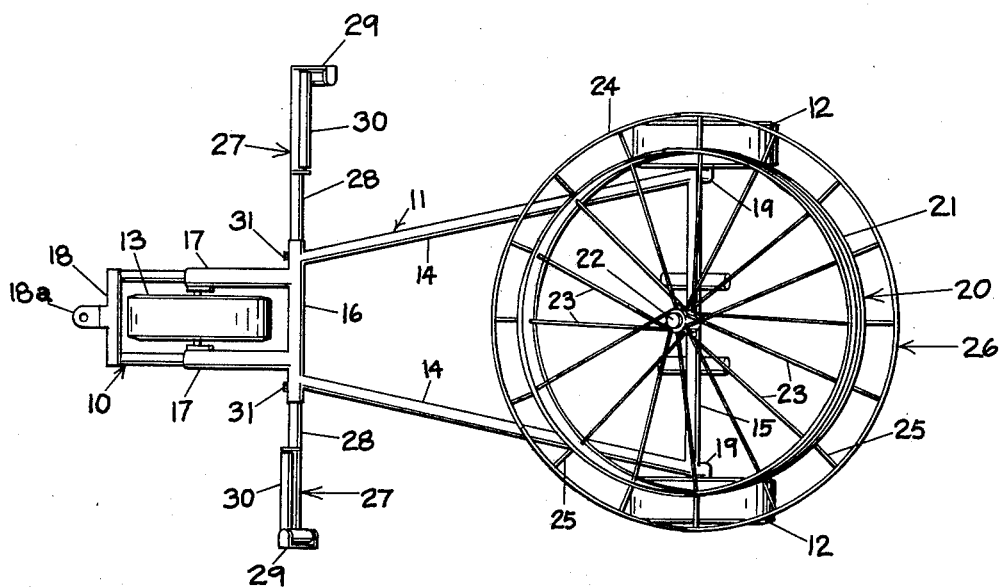
FIG. 2 is a top view of my mobile irrigation hose turner.
Figure 3:
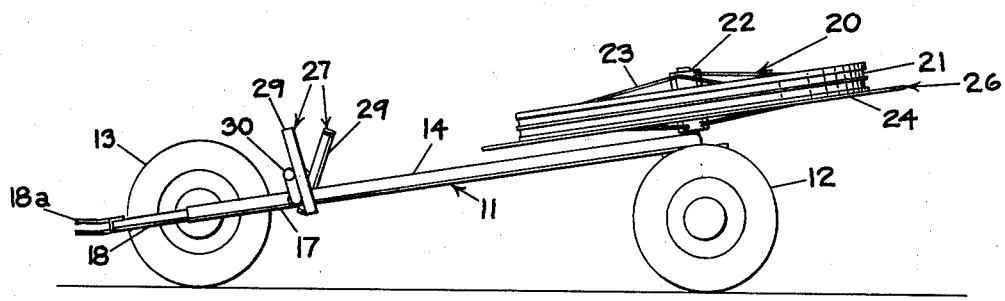
FIG. 3 is a side elevation view of my mobile irrigation hose turner.

Referring now more particularly to the drawings, wherein like numerals refer to like parts throughout the several views, my mobile irrigation hose turner is shown generally at 10 in FIGS. 1–3. The hose turner has a rigid carriage frame 11 which is supported by a pair of wheels 12 located at the rear end of the carriage frame and a third non-steerable wheel 13 located at the front end of the carriage frame and which is laterally positioned at approximately the center of the carriage frame. All three wheels preferably have inflatable rubber tires suitable for highway travel. The two rear wheels 12 are preferably laterally spaced far enough apart to span and avoid at least two rows of crops being irrigated, thereby allowing the centrally positioned front wheel 13 to travel in the furrow between the rows.

As best shown in FIG. 2, the rigid carriage frame 11 has a pair of side frame members 14 which are fixedly attached at their rear ends to a transverse rear frame member 15. The side frame members converge toward the front of the carriage frame where they are fixedly attached at their front ends to a transverse tubular front frame member 16. A pair of laterally spaced front wheel support members 17 extend forwardly from the front frame member 16. The front wheel 13 is journaled between these support members. A U-shaped bracket 18 having a tow hitch 18A is attached to the forward ends of the front wheel support members 17 to facilitate towing of the hose turner unit between irrigation sites. The carriage frame 11 also has a pair of substantially upright support members 19 which are fixedly attached at their upper ends to the rear frame member near the ends thereof. The rear wheels 12 are rotatably mounted to the lower ends of these support members.

A hose supporting reel 20 is rotatably mounted to the rear frame member 15 of the carriage frame 11. The reel comprises a substantially cylindrical rim 21 which is supported on a hub 22 by a plurality of spokes 23 for rotation about a substantially upright axis which is tilted forwardly from the vertical about five to ten degrees. As best shown in FIG. 3, the plane in which the reel 20 rotates therefore declines downwardly toward the front end of the carriage frame to best conform to the angle at which irrigation hose will be received by and discharged from the reel.

The diameter of the rim is approximately the same as the distance between the two rear wheels 12, so as to correspond to the spacing of the two runs of the irrigation hose laid in furrows between crop rows. A circular rail 24, of greater diameter than the rim 21, is suspended outwardly from the rim by extensions 25 of spokes 23. The spoke extensions 25 and the rail 24 form a flange 26 extending around the circumference of rim 21 for providing vertical support to the irrigation hose being turned around the rim.

A pair of hose guides 27 are mounted to the sides of the carriage frame 11 at a position near its front end. Each of the hose guides has a laterally disposed tubular arm member 28 which is received in the respective tubular sleeve end of the front frame member 16. The outside diameter of each arm member is slightly smaller than the inside diameter of the front frame member to allow the arm members to be rotated and extended in telescoping fashion in the front frame member. Each hose guide also has a roller 29 rotatably mounted to the respective arm member in a position transverse thereto, and a roller 30 rotatably mounted to the arm member in a position parallel thereto. The transverse rollers 29 extend upwardly to engage and prevent outward lateral movement of the hose portions forwardly of the reel 20. To ensure that the hose is properly carried by the hose guides, the substantially horizontal rollers 30 are mounted slightly above the plane in which the flange 26 lies as shown in FIG. 3. These rollers thus provide vertical support to the straight portions of the hose forwardly of the reel. The arm members 28 are releasably secured within the front frame member by setscrews 31 which are threaded through the frame member 16 near each end thereof to jam tightly against and immobilize the arm members.

In preparation for irrigating a field, irrigation pipe is laid out to the side of the field approximately one-half the distance from each end and then into the field across a number of rows of crops. A mobile irrigation gun is positioned near one end of the field several rows inwardly from the end of the irrigation pipe. The mobile hose turner is placed at the end of the field behind the irrigation gun. The wheels of both the irrigation gun and hose turner unit are placed in furrows between rows of crops so that the gun and hose turner pass over crops without damaging them. The irrigation hose is laid in a J-pattern with the end of the short run of the hose connected to the irrigation gun. The hose is run backwardly in the furrow to the hose turner unit which straddles several rows of crops. The hose is lifted and turned 180 degrees on the reel of the unit and then run forwardly down another furrow to the end of the irrigation pipe. The mobile irrigation gun, the irrigation pipe, and the irrigation hose form no part of the present invention, and are shown in FIG. 1 of the drawing for illustrative purposes only.

As the irrigation gun proceeds forward on its sweep of the field, it draws the hose and consequently the hose turner unit along behind it. It is apparent that the hose turner unit will travel only approximately one-half the distance that the irrigation gun travels, and thus the movement of the hose relative to the hose turner unit will cause rotation of the reel 20.

The hose turner unit is constrained to move in a straight path behind the irrigation gun by the transverse rollers 29 of the hose guide. Any deviation of the hose turner unit from a straight path causes one of the transverse rollers to engage the hose. Since the hose will be under appreciable tension, a force is exerted on the transverse roller which tends to pull the hose turner unit back into line. It has been determined that the best results are obtained when the transverse roller guiding the irrigation hose portion extending from the irrigation pipe is inclined forwardly, and the transverse roller guiding the hose portion extending from the irrigation gun is inclined rearwardly as shown in the drawings. When the direction of travel of the irrigation gun and hose turner unit is reversed, the orientation of the transverse rollers 29 of the hose guide is also reversed by loosening the set screws 31 and rotating the arm members 28 until the transverse rollers are in their respective desired positions.

When the irrigation gun has traveled substantially the length of the field so that the crops at both ends of the rows have been watered the irrigation gun and the hose turner unit are turned around and moved further in toward the center of the field. An extension is placed on the irrigation pipe and the irrigation hose is again connected as described above. The process is then repeated with the gun and hose turner unit traveling in a direction opposite to the first pass.

It is understood that my invention is not confined to the particular construction and arrangements of parts herein illustrated and described, but embraces all such modified forms thereof as come within the scope of the following claims.

I claim:

1. A mobile irrigation hose turner comprising:
   a. a carriage frame;
   b. a plurality of wheels mounted to and supporting said carriage frame;
   c. a reel mounted for rotation about a substantially upright axis on said carriage frame, said reel having a substantially cylindrical rim extending upwardly from the plane of said reel for engaging an irrigation hose and a peripheral flange extending radially beyond said rim about the circumference of the reel for supporting an irrigation hose turned around said rim; and
   d. hose guide means mounted on said carriage frame forwardly of the axis of said reel.

2. The mobile irrigation hose turner as specified in claim 1 wherein said reel is rotatably mounted to said carriage frame in a plane declining toward the front end of said carriage frame.

3. The mobile irrigation hose turner as specified in claim 1 wherein said hose guide means comprises a pair of hose guides, each of said hose guides having an arm member mounted to and extending laterally from said carriage frame, a roller mounted on said arm member substantially parallel thereto, and a second roller mounted on said arm member transverse thereto.

4. The irrigation hose carrier as specified in claim 3 wherein said reel is rotatably mounted to said carriage frame in a plane declining toward the front end of said carriage frame, and wherein the rollers oriented parallel to their respective arm members are mounted with their upper surfaces above the plane of the flange on said reel.

5. The irrigation hose carrier as specified in claim 3 wherein said carriage frame has sleeve means for adjustably receiving said arm members in telescoping fashion, and means for releasably securing said arm members in said sleeve' means.

6. The mobile irrigation hose turner as specified in claim 1 wherein said carriage frame is supported by three wheels, two of said wheels being spaced laterally apart a distance sufficient to span at least two rows of crops, and the third of said wheels positioned laterally at the center of said carriage frame so as to move between said two rows of crops.

* * * * *